United States Patent
Strauss et al.

(10) Patent No.: US 11,998,946 B2
(45) Date of Patent: Jun. 4, 2024

(54) METHOD FOR PRODUCING LACQUER-COATED ELECTRICAL STRIPS, AND LACQUER-COATED ELECTRICAL STRIP

(71) Applicant: voestalpine Stahl GmbH, Linz (AT)

(72) Inventors: Bernhard Strauss, Leonding (AT); Ronald Fluch, Linz (AT); Roman Tiefenthaller, Linz (AT)

(73) Assignee: VOESTALPINE STAHL GMBH, Linz (AT)

( * ) Notice: Subject to any disclaimer, the term of this patent is extended or adjusted under 35 U.S.C. 154(b) by 560 days.

(21) Appl. No.: 17/251,662

(22) PCT Filed: Jun. 14, 2019

(86) PCT No.: PCT/EP2019/065678
§ 371 (c)(1),
(2) Date: Dec. 11, 2020

(87) PCT Pub. No.: WO2019/238925
PCT Pub. Date: Dec. 19, 2019

(65) Prior Publication Data
US 2021/0162454 A1 Jun. 3, 2021

(30) Foreign Application Priority Data

Jun. 14, 2018 (DE) .................. 10 2018 209 553.1

(51) Int. Cl.
*B05D 1/28* (2006.01)
*B05D 3/10* (2006.01)
(Continued)

(52) U.S. Cl.
CPC .............. *B05D 1/28* (2013.01); *B05D 3/102* (2013.01); *B05D 7/14* (2013.01); *C09D 129/04* (2013.01);
(Continued)

(58) Field of Classification Search
CPC . B05D 1/28; B05D 3/102; B05D 7/14; B05D 7/532; C09D 129/04; H01B 13/065; C08K 3/32; C08K 2003/329
See application file for complete search history.

(56) References Cited

U.S. PATENT DOCUMENTS

2003/0175524 A1* 9/2003 Sashi ................ C22C 38/02
428/421
2006/0193988 A1 8/2006 Walter et al.
(Continued)

FOREIGN PATENT DOCUMENTS

DE 10 2015 102 504 A1 8/2016
DE 10 2017 204 522 A1 9/2018
(Continued)

OTHER PUBLICATIONS

Notice of Reasons for Refusal dated Jan. 31, 2022 in Japanese Patent Application No. 2020-563679 (3 pages) (3 pages English Translation).
(Continued)

*Primary Examiner* — Nathan H Empie
(74) *Attorney, Agent, or Firm* — STAAS & HALSEY LLP (57) ABSTRACT

A process for producing a coated electrical steel strip includes application of a pretreatment layer over a first flat side of a rolled electrical steel strip. The layer thickness of the pretreatment layer is in the range from 10 nm to 100 nm, in particular from 20 nm to 50 nm. The rolled electrical steel strip which has been coated with the pretreatment layer is then coated with an insulating lacquer layer over the pretreatment layer. The insulating lacquer layer is applied by roll application using a roll and no deliberate drying and/or
(Continued)

crosslinking of the pretreatment layer is carried out after application of the pretreatment layer and before coating with the insulating lacquer layer.

11 Claims, 5 Drawing Sheets

(51) Int. Cl.
  B05D 7/14 (2006.01)
  C09D 129/04 (2006.01)
  H01B 13/06 (2006.01)
  C08K 3/32 (2006.01)
(52) U.S. Cl.
  CPC ............ H01B 13/065 (2013.01); *C08K 3/32* (2013.01); *C08K 2003/329* (2013.01)

(56) References Cited

U.S. PATENT DOCUMENTS

| | | | |
|---|---|---|---|
| 2012/0064316 A1 | 3/2012 | Toshin et al. | |
| 2014/0141275 A1* | 5/2014 | Flores Ramirez | C09D 5/08 428/323 |
| 2015/0044450 A1* | 2/2015 | Yuasa | C09D 7/61 428/335 |
| 2017/0117758 A1* | 4/2017 | Nakagawa | B32B 15/011 |
| 2018/0247763 A1 | 8/2018 | Schatzl-Linder et al. | |
| 2019/0366699 A1 | 12/2019 | Fluch et al. | |

FOREIGN PATENT DOCUMENTS

| | | | |
|---|---|---|---|
| EP | 1 291 451 A1 | 3/2003 | |
| EP | 2 255 026 B1 | 5/2015 | |
| EP | 3 060 031 A1 | 8/2016 | |
| EP | 3 206 213 A1 | 8/2017 | |
| GB | 1104338 A * | 2/1968 | ............ C23C 22/74 |
| JP | 09286970 A * | 11/1997 | |
| JP | 2006-519308 A | 8/2006 | |
| JP | 2018-512262 A | 5/2018 | |
| JP | 2006-519308 | 8/2023 | |
| WO | 2009/079540 A1 | 6/2009 | |
| WO | 2012/019777 A1 | 2/2012 | |

OTHER PUBLICATIONS

International Search Report (Forms PCT/ISA/210; PCT/ISA/220); dated Aug. 21, 2019, in International Patent Application No. PCT/EP2019/065678.
Written Opinion (Form PCT/ISA/237); dated Aug. 21, 2019, in International Patent Application No. PCT/EP2019/065678.
Office Action dated Feb. 26, 2019, in German Patent Application No. 10 2018 209 553.1.
Office Action dated Jan. 7, 2022 in Chinese Application No. 2019800397322 (6 pages).
Korean Office Action issued in parallel Korean Application No. 10-2021-7001017 dated Sep. 15, 2023 with English translation.

* cited by examiner

METHOD FOR PRODUCING LACQUER-COATED ELECTRICAL STRIPS, AND LACQUER-COATED ELECTRICAL STRIP

CROSS-REFERENCE TO RELATED APPLICATIONS

This application is a U.S. national stage of International Application No. PCT/EP2019/065678 filed on Jun. 14, 2019. The International Application claims the priority benefit of German Patent Application No. 10 2018 209 553.1 filed on Jun. 14, 2018. Both International Application No. PCT/EP2019/065678 and German Patent Application No. 10 2018 209 553.1 are incorporated by reference herein in their entirety.

BACKGROUND

Described herein is a process for producing a surface-coated electrical steel strip and also to a surface-coated electrical steel strip.

Coated electrical steel strips are used in the electrical industry and there form the starting material in the construction of electric cores which are used in generators, electric motors, transformers or other electrical appliances. Such electric cores are produced by cutting the coated electrical steel strip into individual laminations, stacking of the laminations and joining (e.g. adhesive bonding) of these to give a lamination pack. The layer structure largely suppresses the occurrence of eddy currents in the electric core, as a result of which the efficiency of the electric core is significantly increased.

Depending on the application, electrical steel sheets made of different steel alloys and having different soft-magnetic properties, loss performances, thicknesses and other properties which are important depending on the field of use are selected.

Coating the electrical steel strip with an insulating lacquer layer, which later ensures electrical insulation of the electrical laminations in the stack of laminations, during production is already known. Adhesive insulating lacquer layers which, in addition to insulation also allow adhesive bonding of the electrical laminations in the stack of laminations are referred to as baking lacquer layers. Baking lacquer layers contain an adhesive which is activated during the adhesive bonding process (baking of the lamination packet) and gives the lamination packet the required dimensional stability.

Since the insulating lacquer layers reduce the electrically effective volume of an electric core, very thin layer thicknesses are desirable for a high efficiency. On the other hand, the layer thickness has to be sufficiently great to be able to guarantee the required insulation performance over the life of the electric core.

A further aspect is satisfactory adhesion of the insulating lacquer layer on the electrical steel strip, which can be reduced especially in the case of relatively highly alloyed electrical steel strips.

Existing coating plants apply the insulating lacquer layer to the heat-treated and optionally cleaned (washed and optionally brushed) bare electrical steel strip. The cleaning makes uniform and improved adhesion of the coating possible.

SUMMARY

Aspects of the disclosure may be considered that of providing a process for producing a surface-coated electrical steel strip which allows surface coatings having good adhesion, insulating strength and ageing resistance. In particular, low coating thicknesses should be able to be achieved. Furthermore, aspects of the disclosure may include providing a surface-coated electrical steel strip having the properties mentioned.

Aspects of the disclosure may be achieved by the features of the independent claims. Example embodiments and further developments are set forth in the dependent claims.

Accordingly, a process for producing a coated electrical steel strip includes application of a pretreatment layer over a first flat side of a rolled electrical steel strip, where the layer thickness of the pretreatment layer is in the range from 10 to 100 nm, in particular from 20 to 50 nm, and coating of the rolled electrical steel strip which has been coated with the pretreatment layer with an insulating lacquer layer over the pretreatment layer, where the insulating lacquer layer is applied by roll application using a roll and no deliberate drying and/or crosslinking of the pretreatment layer is carried out after application of the pretreatment layer and before coating with the insulating lacquer layer.

A quality improvement in coating with the insulating lacquer (varnish) coating is achieved by application of the pretreatment layer. An improvement in adhesion of the insulating lacquer layer to the electrical steel strip can be achieved quite generally and is particularly pronounced in the case of relatively highly alloyed electrical steel strips. Furthermore, it has been found that the ageing resistance of the insulating lacquer layer can be improved by the pretreatment layer and furthermore, surprisingly, an increase in the insulating action of the insulating lacquer layer can also be achieved.

Due to the small layer thickness of the pretreatment layer, the pretreatment layer contributes only insignificantly to the total layer thickness of the coating process. Owing to the improvement in the layer properties of the insulating lacquer layer and also the comparatively very small layer thickness of the pretreatment layer, it is assumed that the use of the pretreatment layer makes it possible to reduce the total coating thickness while maintaining comparable layer properties in respect of insulating strength, ageing resistance and/or layer adhesion. Decreased layer thicknesses allow an improvement in the efficiency of the electric cores produced from the electrical steel strip.

After application of the pretreatment layer and before coating with the insulating lacquer layer, deliberate drying and/or crosslinking of the pretreatment layer is not required and is also not carried out. Owing to the small layer thickness of the pretreatment layer, a certain degree of drying of the treatment layer can occur even without deliberate drying (i.e. without additional introduction of energy by use of radiation, heat, etc.)

When using an existing coating plant having two coating stations connected one after the other in the in-line process, the process can be implemented very inexpensively in the production works by changing the first coating station in the direction of movement of the strip for coating with the pretreatment layer, while the insulating lacquer layer is then applied in the second coating station using only a single roll application.

The insulating lacquer layer can be, in particular, a baking lacquer layer. In this case, a coated electrical steel strip is produced which makes not only the insulating action but also baking together of electrical steel laminations to give a dimensionally stable electric core possible. A baking lacquer layer is a thermally curable water-based melt adhesive lacquer layer which includes, for example, an epoxy resin or an epoxy resin mixture and at least one latent hardener such as dicyandiamide. A hardener converts a thermoplastic into a thermoset.

For example, the pretreatment layer is applied by use of roll application using a (first) roll located upstream of the roll in the steel strip path. Other application methods, for example printing processes or spray processes, are likewise possible.

Before application of the pretreatment layer, cleaning of the rolled electrical steel strip by washing and/or brushing or other mechanical and/or chemical cleaning operations can be carried out in order to provide a very bare metal surface which is free of foreign bodies.

The pretreatment layer can generally include exclusively organic constituents or of a composition which contains not only organic constituents but also inorganic constituents. For example, phosphorus (optionally in the form of phosphoric acid) can be present as inorganic constituent. The pretreatment layer can, for example, include a composition containing from 1.0% by weight to 5.0% by weight, in particular from 1.5% by weight to 3.0% by weight, of polyvinyl alcohol (PVAL: $C_2H_4O$), from 0.01% by weight to 0.5% by weight, in particular from 0.05% by weight to 0.3% by weight, of phosphoric acid ($H_3PO_4$), with the balance being an organic or inorganic solvent and/or water. In all the cases mentioned, the pretreatment layer can be free of any hardener. It is possible for the pretreatment layer not to be a baking lacquer (containing a latent hardener).

The pretreatment layer can be applied directly to the first flat side of the rolled electrical steel strip including a steel surface of the electrical steel strip.

The insulating lacquer layer can similarly be applied directly to a surface of the previously applied pretreatment layer.

For example, the layer thickness of the insulating lacquer layer can be in the range from 1 to 12 µm. The layer thickness of the insulating lacquer layer can, in particular, be equal to or less than 6 µm, 4 µm, 2 µm or 1 µm.

A surface-coated electrical steel strip includes a rolled electrical steel strip, a pretreatment layer over a first flat side of the rolled electrical steel strip and an insulating lacquer layer over the pretreatment layer. Such a surface-coated electrical steel strip can display a high coating quality in respect of adhesion, ageing resistance and/or insulating strength of the insulating lacquer layer. These advantages can be particularly apparent when using highly alloyed electrical steel strips and/or when using a baking lacquer as insulating lacquer layer.

The pretreatment layer can contain an inorganic constituent, in particular phosphorus, as a result of which the pretreatment layer can, for example, be detected by simple examination of the surface-coated electrical steel strip for the (inorganic) chemical constituents of the pretreatment layer.

The electrical steel strip can have a total alloying content (of Si and Al, optionally including further alloying elements) of equal to or more than 1.0% by weight, 2.0% by weight, 3.0% by weight or 4.0% by weight. In particular, very highly alloyed grades can be used as electrical steel strip. The electrical steel strip can, in particular, have an Si content of equal to or more than 0.8% by weight, 1.5% by weight, 2.0% by weight or 3.0% by weight.

Example embodiments and further developments will be described by way of examples below with the aid of the schematic drawings, with a different degree of detail sometimes being used in the drawings. Identical reference symbols denote the same or similar parts.

DETAILED DESCRIPTION

Terms such as "apply" and similar terms (e.g. "applied") should for the purposes of the description generally not be interpreted as meaning that the applied layers have to be in direct contact with the surface to which they are applied. It is possible for intermediate elements or layers to be present between the "applied" elements or layers and the surface underneath. However, the abovementioned or similar terms can for the purposes of the disclosure also have the specific meaning that the elements or layers are in direct contact with the surface underneath, i.e. there are no intermediate elements or layers present in between.

The term "over" used in respect of an element or a layer of material which is formed or applied "over" a surface can here be used to mean that the element or the layer of material is applied "indirectly on" the surface, with intermediate elements or layers being able to be present between the surface and the element or layer of material. However, the term "over" can also have the specific meaning that the element or the layer of material which is applied "over" a surface is applied "directly to" the surface, i.e. is, for example, in direct contact with the surface concerned. The same applies analogously for similar terms such as "above", "under", "underneath", etc.

Figure 1:
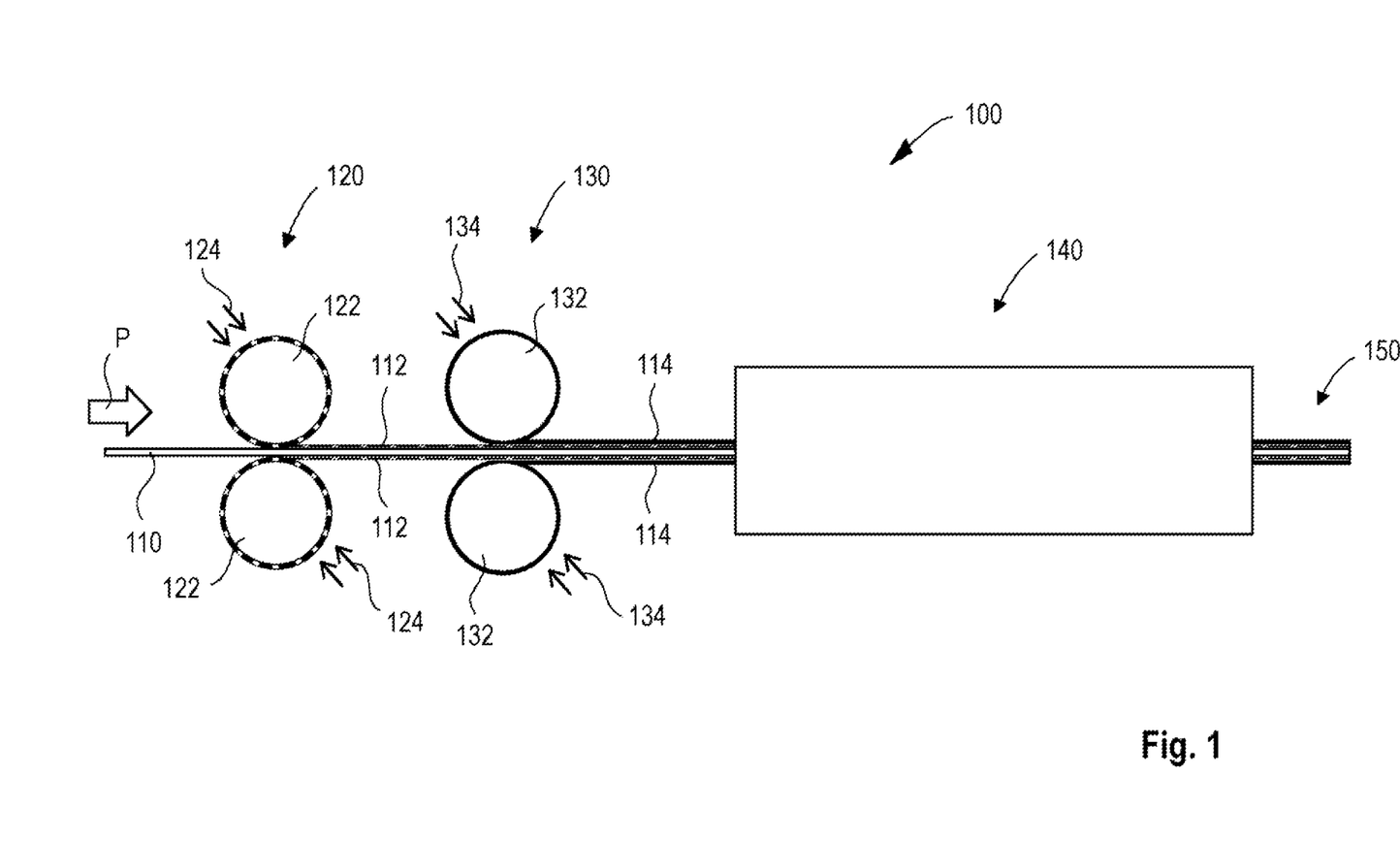
FIG. 1 is a longitudinal sectional view of an example process for application of a pretreatment layer and an insulating lacquer layer over the pretreatment layer to an electrical steel strip and also drying of the layers in a drying plant.

FIG. 1 shows by way of example a process for producing a coated electrical steel strip 200 (see FIG. 2) from an electrical steel strip 110 in a strip coating plant 100. The electrical steel strip 110 is fed continuously (see arrow P) to the strip coating plant 100. The electrical steel strip 110 can be, for example, a cold-rolled, non-grain-oriented electrical steel strip in the finally heat-treated state (e.g. DIN EN 10106). Other electrical steel sheets, for example hot-rolled electrical steel sheets and/or electrical steel sheets which have not been subjected to final heat treatment, etc., are likewise possible. Cold-rolled or hot-rolled electrical steel sheets are used, for example, as pole sheets in exciters and generators or in transformers, etc.

The electrical steel strip 110 fed to the strip coating plant 100 can, for example, be present in the form of a "continuous" metal strip which can optionally be rolled off from a coil (not shown) in the direction of the arrow P.

The strip coating plant 100 includes at least one pretreatment station 120 and a coating station 130. It can additionally have a drying plant 140, for example a dry baking oven.

In the example depicted here, the coating plant 100 is depicted as a two-sided coating plant 100. However, it is also possible for only one flat side of the electrical steel strip 110 (for example the upper side shown in FIG. 1) to be coated. In this respect, all that is described below applies both to the case of one-sided coating and for the possibility depicted of coating the electrical steel strip 110 on both flat sides. In the second case (two-sided coating), all that is described in respect of pretreatment, coating and drying can apply both to the processing of the upper side of the strip and to the processing of the opposite strip underside of the electrical steel strip 110. Furthermore, two-sided pretreatment and coating can also be carried out using different layers on both sides of the strip.

The electrical steel strip 110 can, for example, be the relatively low-alloy electrical steel strip Isovac® 800-50A (containing 0.6% by weight of Si and 0.4% by weight of Al), wherein many other electrical steel strips or Isovac® products, in particular having higher proportions of alloying constituents, can likewise be used.

The uncoated and optionally chemically and/or mechanically cleaned electrical steel strip 110 is coated with a pretreatment layer 112 in the pretreatment station 120. Coating can be carried out over the full area, i.e. the pretreatment layer 112 can completely cover the surface of the electrical steel strip 110.

The pretreatment layer 112 can be applied by use of a roll or roller 122 (e.g. a pair of rolls or rollers 122) to the upper flat side (or to the opposite lower flat side) of the electrical steel strip 110. In the case of roll application, the roll 122 runs over the moving electrical steel strip 110 and deposits a liquid pretreatment substance 124, which has previously been applied to the roll 122, in the form of a thin film onto the surface of the electrical steel strip 110. Here, the layer thickness of the pretreatment layer 112 can be set relatively precisely via the parameters of roll application.

After application of the pretreatment layer 112 to one or both sides of the electrical steel strip 110, the pretreated electrical steel strip 110 runs through the coating station 130. In the coating station 130, a wet insulating lacquer layer 114 is applied, for example by use of a roll 132 (or a pair of rolls 132) over the pretreatment layer 112. Application can likewise be effected by roll application, with the layer thickness (measured after drying) once again being able to be set relatively precisely by parameters of the roll application. Coating with the surface coating 114 can also be effected over the full area, i.e. the surface of the pretreatment layer 112 is completely covered.

In the case of two-sided coating with different coatings on both sides, it is possible, for example, for a different insulating lacquer layer 114 to be applied to the underside of the electrical steel strip 110 than to the upper side. For example, a baking lacquer layer can be applied to the underside (upper side) and an insulating lacquer layer without adhesive properties can be applied to the upper side (underside).

The pretreatment coating 112 serves to increase the adhesion of the insulating lacquer 134 to the electrical steel strip 110. High-alloy electrical steel strips in particular display increased formation of aluminum oxides and/or silicon oxides on the surface, which can adversely affect the adhesion of the insulating lacquer layer to the electrical steel strip 110. The pretreatment layer 112 offers the insulating lacquer layer 114 an improved adhesion base.

Very high-alloy electrical steel strips can, for example, have a total alloying component content of equal to or more than 4% by weight. For example, very high-alloy electrical steel strips can have a silicon content of equal to or more than 3% by weight and, for example, an aluminum content of equal to or more than 1% by weight.

The pretreatment layer 112 can be relatively thin and have a thickness of from about 10 nm to 100 nm. In particular, thicknesses below 50 nm can be set and make a significant improvement in the adhesion of the surface coating possible.

As pretreatment substances 124, it is possible to use purely organic substances or else organic substances with inorganic constituents. For example, the pretreatment layer 112 can contain polyvinyl alcohol (PVAL), phosphoric acid (PS) and an organic and/or inorganic solvent, for example water, or include these constituents.

The insulating lacquer 134 can be an adhesive insulating lacquer, i.e. a baking lacquer, which allows dry adhesive bonding of the electrical steel laminations in the electric core without additional joining means (for example welded joins). Insulating lacquers 134 without an adhesive function can likewise be used. method It is possible to use, for example, insulating lacquers of the insulation classes C3/EC-3, C4/EC-4, C5/EC-5 or C6/EC-6.

Insulating lacquers 134 of the insulation class C3/EC-3 are unfilled lacquers which have an organic basis and can contain purely organic constituents and serve to insulate electrical steel laminations which are not subjected to any further heat treatment process. These lacquers have excellent stamping properties.

Insulating lacquers 134 of the insulation class C4/EC-4 are inorganic insulating lacquers which are stable to heat treatment and have good welding properties. These inorganic, water-dilutable insulating lacquers avoid sticking-together of electrical steel sheets on heat treatment.

Insulating lacquers 134 of the insulation class C5/EC-5 are unfilled lacquers having an organic or inorganic basis for applications which require better insulating properties, heat resistance and possibly improved weldability.

Insulating lacquers 134 of the insulation class C6/EC-6 are filled lacquers having an organic or inorganic basis and offer further-improved insulating properties and increased compressive strengths. These lacquers are based on thermally stable, organic polymers having a high proportion of inorganic fillers. They are used, in particular, for large electric cores which are subjected to high compressive and temperature stresses.

The pretreatment station 120 and the coating station 130 can be arranged close together in space and, based on the strip speed, time. For example, provision can be made for the physical distance between the pretreatment station 120 and the second coating station 130 (i.e., for example, the distance between the axes of the rolls 122 and 132) to be equal to or less than 10 m, 8 m, 6 m, 5 m or 4 m. The time between application of the pretreatment layer 112 in the pretreatment station 120 and the application of the insulating lacquer layer 114 in the coating station 130 can be equal to or less than 20 s, 15 s, 10 s, 5 s or 3 s. Customary strip speeds can be, for example, in the region of 100 m/min, with this value being able to vary, for example, by ±10%, ±20%, ±30%, ±40% or ±50%.

In the steel strip path downstream of the coating station 130, there is, for example, the drying oven 140. The distance in time and space between the second coating station 130 and the entry into the drying oven 140 can, for example, have the same values as have been indicated above for the distance in time and space between the pretreatment station 120 and the coating station 130.

In the drying oven 140, the insulating lacquer layer 114 is dried. The drying oven 140 can for this purpose be configured as a continuous drying oven (tunnel oven) through which the coated electrical steel strip 110 runs continuously. For example, the maximum temperature of the electrical steel strip 110 in the drying oven 140 can be in the range from 150° C. to 300° C., with, in particular, temperature values of equal to or greater than 170° C., 180° C., 190° C., 200° C., 210° C., 220° C. or 230° C. and/or equal to or less than 250° C., 220° C., 210° C., 200° C. or 190° C. being able to be provided.

The duration of the heat treatment in the drying oven 140 can be, for example, in the range from 10 s to 40 s and in particular less than, equal to or greater than 20 s or 30 s. Other temperatures and heat treatment times are likewise possible.

In the drying oven 140, a physical and/or chemical bond (covalent bond) can be formed between the pretreatment layer 112 and the insulating lacquer layer 114. This increases the adhesion. The insulating lacquer layer 114 is dried to at least such an extent that it is joined mechanically stably and in a manner resistant to abrasion to the electrical steel strip 110 in the strip path at the outlet end of the drying oven 140. This then allows further handling of the drying, coated electrical steel strip 150 in the strip path downstream of the drying oven 140, for example through deflection rolls and/or by rolling up to give a coil (not shown in FIG. 1).

Figure 2:
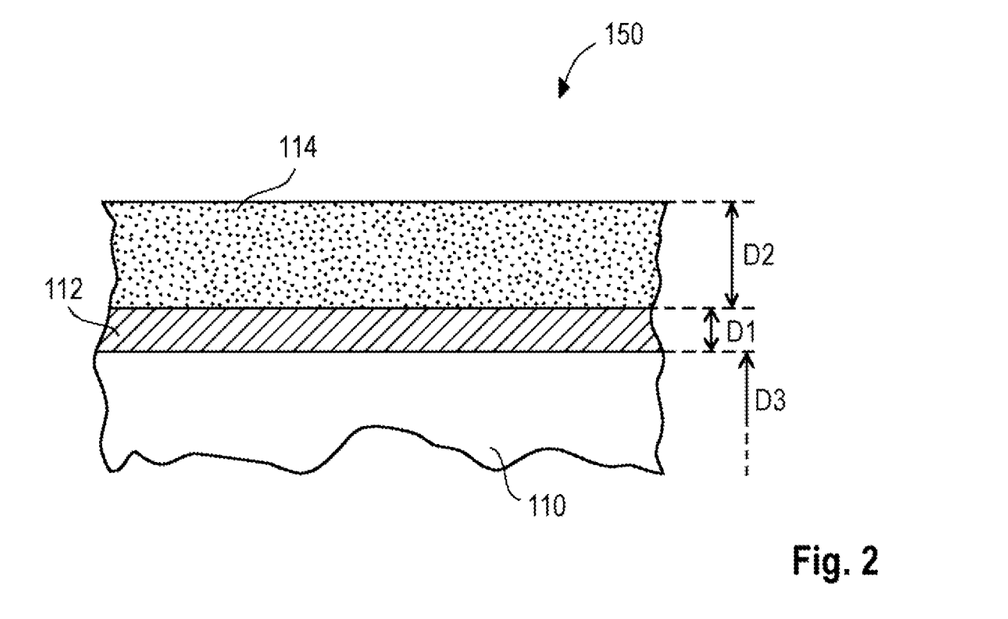
FIG. 2 is a longitudinal sectional view of a section close to the surface of an electrical steel strip after drying of the layers.

FIG. 2 shows, in longitudinal section, a simplified depiction of a section close to the surface of the coated electrical steel strip 110 in the region downstream of the drying oven 140. Layer thickness fluctuations are not shown. The cross-sectional view can be identical to the longitudinal section shown.

The (dry) pretreatment layer 112 has a thickness D1 and the (dry) insulating lacquer layer (e.g. baking lacquer layer) 114 has a thickness D2. The layer thickness D1 can be, for example, smaller by a factor of 10, 25 or 50 or more than the layer thickness D2. For example, the layer thickness D2 can be equal to or greater than or smaller than 2 μm, 3 μm, 4 μm, 5 μm, 6 μm, 7 μm, 8 μm, 9 μm, 10 μm, 11 μm or 12 μm. The sheet thickness D3 of the electrical steel strip 110 can, for example, be equal to or smaller than 0.5 mm, 0.4 mm, 0.35 mm or 0.3 mm.

Figure 3:
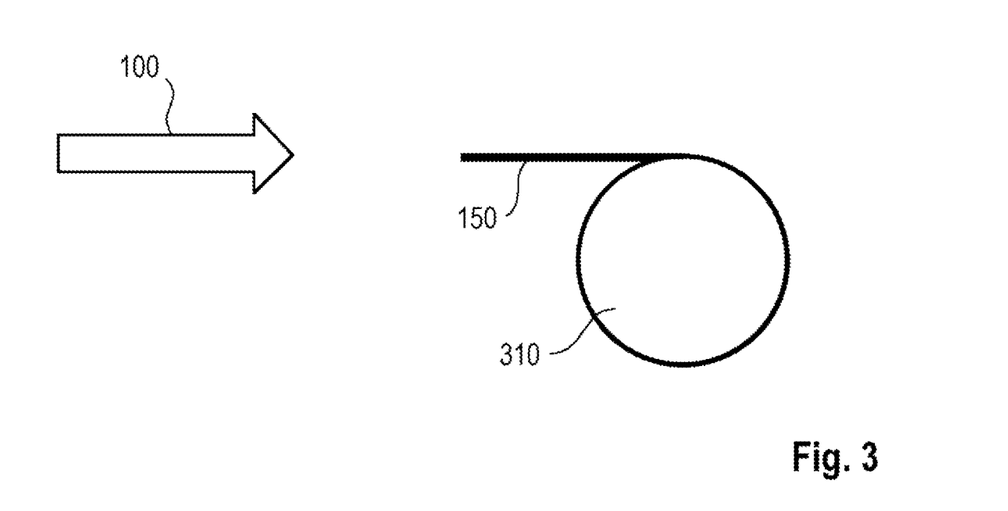
FIG. 3 is a coil of a coated electrical steel strip according to one embodiment.

FIG. 3 shows a coil (roll) 310 of the coated electrical steel strip 150 as can be rolled up at the outlet end of the strip coating plant 100. The coil 310 can be, for example, sent to the customer and processed further there to give an electrical core.

Figure 4:
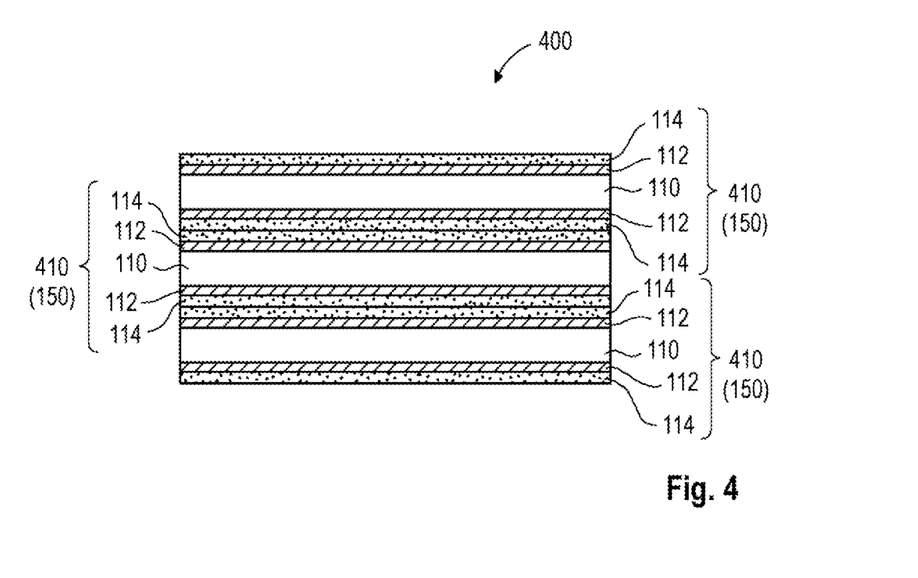
FIG. 4 is an electrical lamination stack made up of coated electrical laminations stacked over one another.

FIG. 4 shows a schematic view of a section of an electric core 400 which has been made by stacking electrical steel sheets 410 which are obtained by transverse parting of the coated, dried electrical steel strip 150.

The electrical steel sheets 410 are usually brought to their final shape by use of a shaping operation, for example by stamping or laser cutting, before stacking.

If the insulating lacquer layers 114 are baking lacquer layers, the stack of laminations is consolidated by curing of the insulating lacquer layers 114. The consolidation mechanism is based on a chemical reaction, usually three-dimensional crosslinking of the adhesive in the insulating lacquer layer (baking lacquer layer) 114. Curing of the baking lacquer can be effected by clamping of the coated electrical steel sheets 410 and heating of the layer stack, for example in an oven. If the insulating lacquer layers 114 are not made of a baking lacquer, other measures (e.g. welding) are used for consolidating the layer stack (lamination packet).

In the example presented here, an electric core 400 which has been produced from an electrical steel sheet 410 coated on both sides is depicted. As mentioned above, it is also possible to use electrical steel sheets 410 coated on one side or electrical steel sheets 410 coated with different coatings on both sides, as a result of which higher stacking factors may be able to be achieved. FIG. 4 is not true to scale because the thicknesses of the pretreatment layers 112 are too large.

Figure 5:
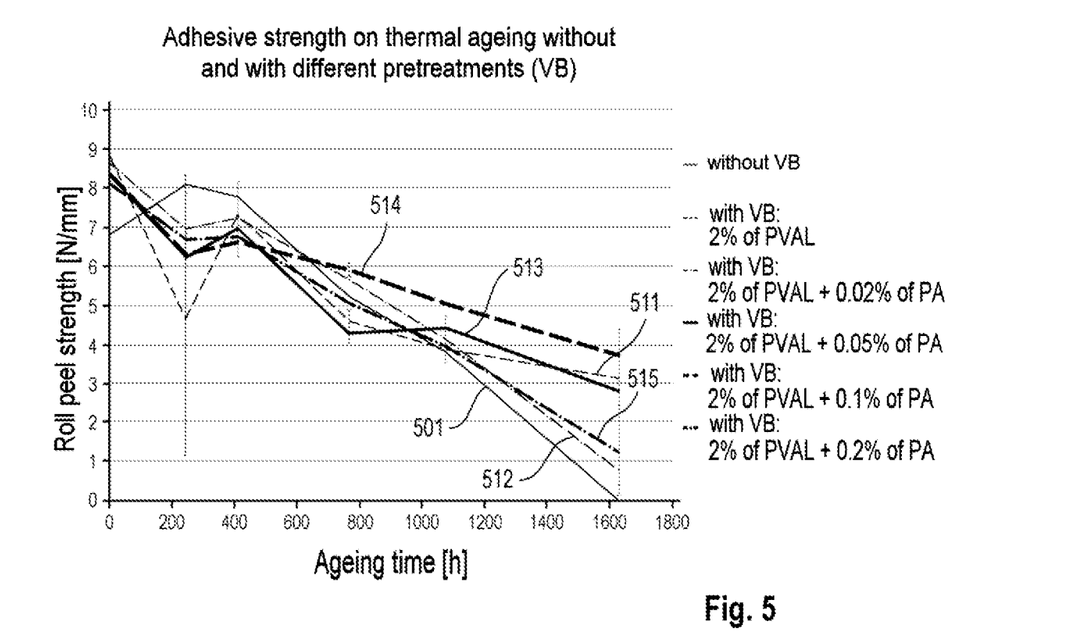
FIG. 5 is in an example way the course of the roll peel strength (separation force in N/mm) over the ageing time of adhesively bonded electrical steel strip samples on thermal ageing for different compositions of the pretreatment layer and without pretreatment layer.

The graph of FIG. 5 shows the effect of different pretreatment layers 112 on the strength of an adhesive bond between two electrical steel sheets which have been coated with a baking lacquer as insulating lacquer layer 114. The separation force (roll peel strength) required to tear two adhesively bonded electrical steel sheets apart again is depicted. Here, the experimental results relate to different durations of thermal ageing carried out at 180° C. under a normal atmosphere.

It can be seen that the strength of the bond decreases with increasing ageing time for all samples. In the case of a sample 501 which was produced without a pretreatment layer 112 under the respective baking lacquer layer 114, the residual adhesive force after 1630 hours (h) was only 0 N/mm, i.e. the adhesive bond had been lost. The samples 511, 512, 513, 514 and 515 were produced using a pretreatment layer 112 which contained 2.0% by weight of polyvinyl alcohol (PVAL) and a different proportion of phosphoric acid (PA), balance of water. The phosphoric acid addition was 0.0% by weight in the case of sample 511, 0.02% by weight in the case of sample 512, 0.05% by weight in the case of sample 513, 0.1% by weight in the case of sample 514 and 0.2% by weight in the case of sample 515.

All pretreatment variants reduce the loss of adhesion as a result of thermal ageing, i.e. they are better than with no pretreatment. This is presumably attributable to the baking lacquer layer(s) 114 having improved adhesion to the electrical steel strip 110 because of the pretreatment layer(s) 112 underneath. For example, a proportion of phosphoric acid of from 0.05% by weight to 0.2% by weight, in particular about 0.1% by weight (e.g. ±50%, ±100% or ±200%) appears to be particularly advantageous for maintaining the adhesion/adhesive force on (thermal) ageing. The experiments were carried out using the relatively low-alloy electrical steel strip Isovac® 800-50A (containing 0.6% by weight of Si and 0.4% by weight of Al).

Figure 6:
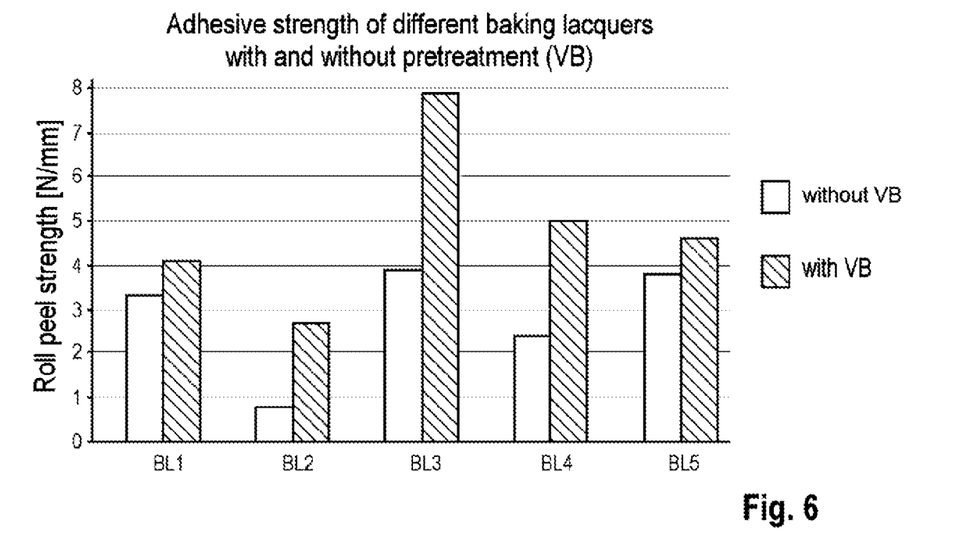
FIG. 6 is in an example way the roll peel strength (separation force in N/mm) for different insulating lacquers (baking lacquers) of adhesively bonded electrical steel strip samples, in each case with and without pretreatment layer.

FIG. 6 shows experimental results on the adhesion of different baking lacquers on a high-alloy (total proportion of alloying constituents 4% by weight, here 2.5% by weight of Si and 1.5% by weight of Al) electrical steel strip 110. The pretreatment substance 124 in each case contained 2% by weight of PVAL and 0.2% by weight of phosphoric acid, balance of water (i.e. corresponds to the sample 515 in FIG. 5). The different baking lacquers are designated as BL1, BL2, BL3, BL4 and BL5; the right-hand columns of the pairs of bars relate to the treated samples made from adhesively bonded electrical steel strips, while the left-hand bars relate to identical samples but without a pretreatment layer 112 under the respective baking lacquer layers 114.

FIG. 6 shows that all baking lacquer variants with pretreatment are better than without pretreatment. FIG. 6 also shows that different baking lacquers form adhesive bonds with very different strengths.

Figure 7:
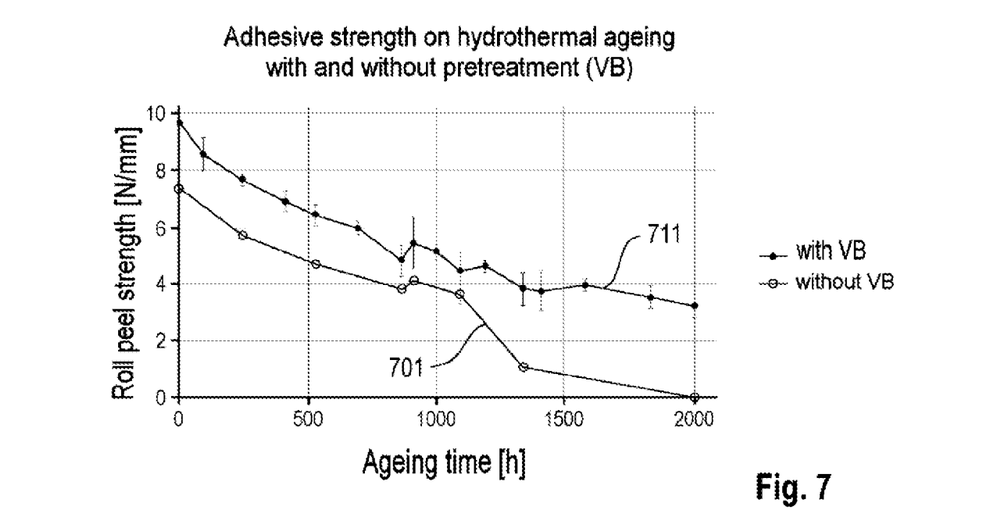
FIG. 7 is in an example way the course of the roll peel strength (separation force in N/mm) over the ageing time of adhesively bonded electrical steel strip samples on hydrothermal ageing, with and without pretreatment layer.

FIG. 7 shows experimental results for hydrothermal ageing of samples made up of two adhesively bonded strip-shaped electrical steel sheets. The samples were produced using the same baking lacquer layer (in each case BL1 of FIG. 6), but in one case without pretreatment layer (curve 701) and in another case with pretreatment layer (curve 711). Hydrothermal ageing was carried out at 85° C. and a relative humidity of 85%. The pretreatment substance was 2% by weight of PVAL without phosphoric acid (corresponding to curve 511 of FIG. 5); a low-alloy electrical steel strip (Isovac® 800-50A, containing 0.6% by weight of Si and 0.4% by weight of Al) was used as electrical steel strip 110.

FIG. 7 shows that hydrothermal ageing is better with pretreatment than without pretreatment. In the case of sample 701 without pretreatment, there was no longer any cohesion of the adhesively bonded electrical steel strips after 2000 hours (h), while in the case of the sample with a pretreatment layer, there was still a roll peel strength of somewhat less than 4 N/mm even after 2000 hours (h). Furthermore, FIG. 7 shows that the initial adhesion (at h=0) is, because of the low-alloy electrical steel sheet used here, significantly higher than in the depiction of FIG. 6 using a high-alloy electrical steel strip (with the same baking lacquer BL1).

Furthermore, it has surprisingly been found that the electrical insulation resistance between adjacent electrical steel sheets is improved by the use of a pretreatment layer 112. This is surprising because the insulating action of the baking lacquer layer 114 is usually considered to be a volume effect and should depend only to a small extent on the surface properties of the baking lacquer layer.

Figure 8:
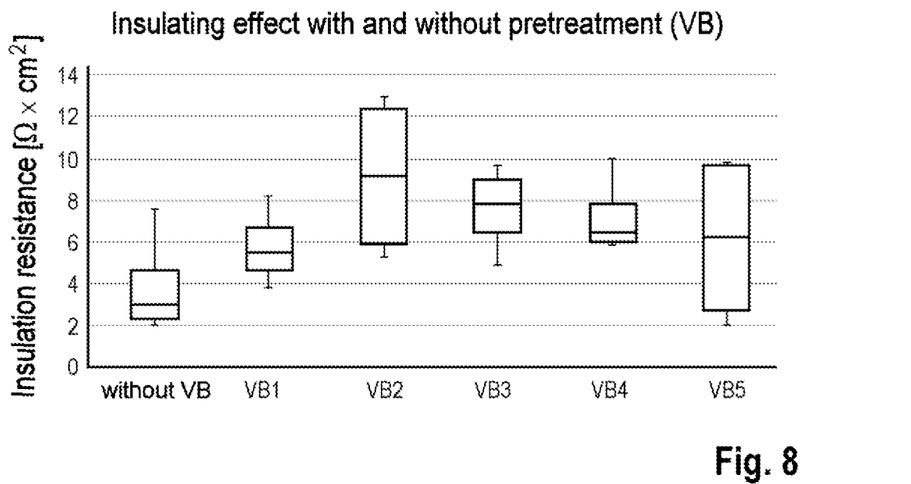
FIG. 8 is in an example way measured values for the electrical insulation resistance (in ohms×cm$^2$) of coated electrical steel strip samples having different pretreatment layers and without pretreatment layers.

The experimental results of FIG. 8 relate to samples of coated electrical steel strips which were produced without a pretreatment layer 112 (without VB) and with different pretreatment layers 112 (VB1, VB2, VB3, VB4, VB5). The pretreatment substance VB2 having the maximum insulation resistance corresponds here to the pretreatment substance used in FIG. 5 in the case of curve 514 (2.0% by weight of PVAL, 0.1% by weight of phosphoric acid, balance of water). The same insulating lacquer layers 114 (i.e. the same materials and the same layer thicknesses) were used for all samples. As electrical steel strip 110, use was once again made of Isovac® 800-50A (0.6% by weight of Si and 0.4% by weight of Al).

FIG. 8 clearly shows that the insulation resistance in all pretreatment variants is better than without pretreatment, i.e. the insulation resistance is always increased by the use of a pretreatment layer 112 (compare without VB with VB1-VB5). Here, the horizontal middle lines of the respective measurement bars indicate the average of the insulation resistance over a plurality of samples; the bar length denotes the scatter at +25% and −25% of the experimental results based on the average, and the vertical tolerance lines indicate the measured minimum and maximum values of the insulation resistance in the corresponding batch of samples.

It is assumed that the experimental results of FIGS. 5 to 8 can be generalized to the corresponding properties of the electric cores 400, so that it can be assumed that electric cores 400 which are produced from electrical steel laminations with pretreatment layers 112 underneath the insulating lacquer layers 114 likewise display improved properties in respect of ageing, hydrothermal ageing, strength of the lamination packet and electrical insulation effect of the insulating lacquer layers 114.

In particular, provision can be made for such electric cores 400 to be equipped with cooling channels in the adhesively bonded lamination packet since the risk of corrosion by moisture penetrating underneath the insulating lacquer layers 114 is significantly reduced (see FIG. 7).

Examples of a coated electrical steel strip are described below.

This can include a rolled electrical steel strip, a pretreatment layer over a first flat side of the rolled electrical steel strip and an insulating lacquer layer over the pretreatment layer.

The pretreatment layer can contain an inorganic constituent, in particular phosphorus.

The pretreatment layer can be free of any hardener or baking lacquer.

The insulating lacquer layer can be a baking lacquer layer.

The electrical steel strip can have a total proportion of alloying constituents of equal to or more than 1.0% by weight, 2.0% by weight, 3.0% by weight or 4.0% by weight.

The electrical steel strip can have a proportion of Si of equal to or more than 0.8% by weight, 1.5% by weight, 2.0% by weight or 3.0% by weight.

A description has been provided with reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A process for producing a coated electrical steel strip, comprising:

application of a pretreatment layer over a first flat side of a rolled electrical steel strip, where a layer thickness of the pretreatment layer is in a range from 10 nm to 100 nm; and after application of the pretreatment layer, coating of the rolled electrical steel strip with an insulating lacquer layer over the pretreatment layer, the insulating lacquer layer being applied by roll application using a roll, and without deliberate drying and/or crosslinking of the pretreatment layer being carried out after application of the pretreatment layer and before coating with the insulating lacquer layer, wherein the pretreatment layer consists from 1.0% by weight to 5.0% by weight or 1.5% by weight to 3.0% by weight, of polyvinyl alcohol, from 0.01% by weight to 0.5% by weight, or from 0.05% by weight to 0.3% by weight, of phosphoric acid, and a remaining balance of an organic or inorganic solvent and/or water.

2. A process for producing a coated electrical steel strip, comprising:

application of a pretreatment layer over a first flat side of a rolled electrical steel strip, where a layer thickness of the pretreatment layer is in a range from 10 nm to 100 nm; and after application of the pretreatment layer, coating of the rolled electrical steel strip with an insulating lacquer layer over the pretreatment layer, the insulating lacquer layer being applied by roll application using a roll, and without deliberate drying and/or crosslinking of the pretreatment layer being carried out after application of the pretreatment layer and before coating with the insulating lacquer layer, wherein the insulating lacquer layer is a baking lacquer layer which includes an epoxy resin or an epoxy resin mixture and at least one latent hardener configured to convert a thermoplastic into a thermoset, wherein the pretreatment layer consists from 1.0% by weight to 5.0% by weight or 1.5% by weight to 3.0% by weight, of polyvinyl alcohol, from 0.01% by weight to 0.5% by weight, or from 0.05% by weight to 0.3% by weight, of phosphoric acid, and a remaining balance of an organic or inorganic solvent and/or water.

3. The process according to claim 2, wherein the layer thickness of the pretreatment layer is in the range from 20 nm to 50 nm.

4. The process according to claim 2, wherein the pretreatment layer is applied by roll application using another roll located upstream of the roll used for applying the insulating lacquer layer by roll application, with respect to a strip path along which the rolled electrical steel strip is fed.

5. The process according to claim 2, further comprising, before application of the pretreatment layer, cleaning of the rolled electrical steel strip by washing and/or brushing.

6. The process according to claim 2, wherein the pretreatment layer consists from 1.5% by weight to 3.0% by weight, of polyvinyl alcohol, from 0.05% by weight to 0.3% by weight, of phosphoric acid, and the remaining balance of the organic or inorganic solvent and/or water.

7. The process according to claim 2, wherein the pretreatment layer is applied directly to the first flat side of the rolled electrical steel strip, consisting of a steel surface of the rolled electrical steel strip.

8. The process according to claim 2, wherein the insulating lacquer layer is applied directly to a surface of the pretreatment layer.

9. The process according to claim 2, wherein a layer thickness of the insulating lacquer layer is in a range from 1 µm to 12 µm.

10. The process according to claim 2, wherein a layer thickness of the insulating lacquer layer is equal to or less than 6 µm, 4 µm, 2 µm or 1 µm.

11. The process according to claim 2, further comprising:
application of a further pretreatment layer over a second flat side of the rolled electrical steel strip; and
after application of the further pretreatment layer, coating of the rolled electrical steel strip with a further insulating lacquer layer over the further pretreatment layer.

* * * * *